United States Patent
Sharma

(10) Patent No.: US 8,611,541 B2
(45) Date of Patent: Dec. 17, 2013

(54) METHOD AND APPARATUS FOR APPLYING A CIPHERING CONFIGURATION IN A WIRELESS COMMUNICATION NETWORK

(75) Inventor: Neha Sharma, Bangalore (IN)

(73) Assignee: Samsung Electronics Co., Ltd (KR)

( * ) Notice: Subject to any disclaimer, the term of this patent is extended or adjusted under 35 U.S.C. 154(b) by 23 days.

(21) Appl. No.: 13/351,659

(22) Filed: Jan. 17, 2012

(65) Prior Publication Data

US 2012/0183142 A1  Jul. 19, 2012

(30) Foreign Application Priority Data

Jan. 17, 2011  (IN) .............................. 157/CHE/2011
Jan. 10, 2012  (KR) ........................ 10-2012-0002855

(51) Int. Cl.
*H04W 12/04* (2009.01)
(52) U.S. Cl.
USPC ........................................................ 380/273
(58) Field of Classification Search
USPC ........................................................ 380/273
See application file for complete search history.

(56) References Cited

U.S. PATENT DOCUMENTS

| 6,870,932 B2 * | 3/2005 | Jiang ............................ 380/273 |
| 6,987,981 B2 * | 1/2006 | Kuo ............................... 455/502 |
| 8,078,144 B2 * | 12/2011 | Funnell et al. ................ 455/410 |
| 2002/0164029 A1 * | 11/2002 | Jiang ............................ 380/270 |
| 2004/0153896 A1 * | 8/2004 | Jang ............................ 714/701 |
| 2006/0050679 A1 * | 3/2006 | Jiang ............................ 370/350 |
| 2007/0183328 A1 * | 8/2007 | Jiang ............................ 370/232 |
| 2008/0130892 A1 * | 6/2008 | Funnell et al. ................ 380/270 |
| 2009/0168751 A1 * | 7/2009 | Sharma et al. ................ 370/350 |

FOREIGN PATENT DOCUMENTS

KR  1020090073990  7/2009

OTHER PUBLICATIONS

3rd Generation Partnership Project; Technical Specification Group Radio Access Network; Radio Resource Control (RRC); Protocol Specification (Release 8), 3GPP TS 25.331 V8.3.1, Aug. 2008.

* cited by examiner

*Primary Examiner* — Kambiz Zand
*Assistant Examiner* — Aubrey Wyszynski
(74) *Attorney, Agent, or Firm* — The Farrell Law Firm, P.C.

(57) ABSTRACT

Methods and devices are provided for applying a ciphering configuration in a wireless communication network. The method includes initiating an entity reset procedure by a first entity in the wireless communication network; synchronizing Hyper Frame Numbers (HFNs) associated with the first entity and a second entity, respectively, during the entity reset procedure; and applying a new ciphering configuration by the first entity and the second entity, upon completing the entity reset procedure, without updating the synchronized HFNs associated with the first entity and the second network, respectively.

20 Claims, 4 Drawing Sheets

METHOD AND APPARATUS FOR APPLYING A CIPHERING CONFIGURATION IN A WIRELESS COMMUNICATION NETWORK

PRIORITY

This application claims priority under 35 U.S.C. §119(a) to an Indian Patent Application Serial No. IN 157/CHE/2011, which was filed in the Indian Patent Office on Jan. 17, 2011, and to Korean Patent Application Serial No. 10-2012-0002855, which was filed in the Korean Intellectual Property Office on Jan. 10, 2012, the entire disclosure of each of which is hereby incorporated by reference.

BACKGROUND OF THE INVENTION

1. Field of the Invention

The present invention relates generally to wireless communications, and more particularly, to applying a ciphering configuration by entities in a wireless communication network.

2. Description of the Related Art

In Universal Mobile Telecommunications System (UMTS), data flow on any connection, known as a radio bearer, between a User Equipment (UE) and an UMTS Terrestrial Radio Access Network (UTRAN) can be ciphered i.e., encrypted, at any point in time, under control of the UTRAN.

Typically, the UTRAN a starts or stops ciphering, or changes a ciphering configuration by sending a Security Mode Command (SMC) including ciphering information to the UE. The ciphering information includes a ciphering mode, a ciphering key, an activation time associated with a receiver and a transmitter, and a Hyper Frame Number (HFN). The ciphering activation time is a logical sequence number at which the UE and the UTRAN both apply a new ciphering configuration used on that radio bearer in a given direction, i.e., either uplink or downlink. This synchronizes the UE and the UTRAN, and facilitates a smooth ciphering changeover without undue delay.

According to the $3^{rd}$ Generation Partnership Project (3GPP) Technical Specification (TS) 25.331 V10.1.0, a UE and a UTRAN are to ignore an activation time associated with a new ciphering configuration, and apply the new ciphering configuration in both uplink and downlink immediately after a reset or re-establishment procedure.

However, when a UE applies a new ciphering configuration in an uplink and sends an Acknowledgement Mode (AM) Data (AMD) Protocol Data Unit (PDU) to the UTRAN, which gets lost or delayed, e.g., due to an interruption caused by a reset or re-establishment procedure, a UTRAN may initiate a reset procedure and discard any incoming AMD PDUs from the UE during the reset procedure. As a result, the UTRAN may not be able to apply a new ciphering configuration in the corresponding downlink.

Additionally, during a reset procedure, the UE and the UTRAN synchronize an HFN in the uplink and the downlink. However, as per the 3GPP TS described above, the UE and the UTRAN ignore the activation time and apply the new ciphering configuration in the uplink and the downlink, thereby losing synchronization of the HFN in the uplink and downlink.

Further, HFN synchronization may also be lost due to a re-establishment procedure performed when initializing peer Radio Link Control (RLC) entities in the UE and/or the UTRAN.

SUMMARY OF THE INVENTION

Accordingly, the present invention is designed to address at least the problems and/or disadvantages described above and to provide at least the advantages described below.

An aspect of the present invention is to provide a method and apparatus for applying a ciphering configuration in a wireless network to prevent synchronization loss of an HFN when a new ciphering configuration is applied in the wireless network.

In accordance with an aspect of the present invention, a method is provided for applying a ciphering configuration by entities in a wireless communication network, wherein the entities include a UE and a UTRAN. The method includes initiating an entity reset procedure by a first entity in the wireless communication network; synchronizing Hyper Frame Numbers (HFNs) associated with the first entity and a second entity, respectively, during the entity reset procedure; and applying a new ciphering configuration by the first entity and the second entity, upon completing the entity reset procedure, without updating the synchronized HFNs associated with the first entity and the second network, respectively.

In accordance with another aspect of the present invention, a non-transitory computer-readable storage medium is provided, which has instructions stored therein for applying a ciphering configuration, that when executed by entities in a wireless communication network, cause the entities in the wireless communication network to perform a method that includes initiating an entity reset procedure by a first entity in the wireless communication network; synchronizing Hyper Frame Numbers (HFNs) associated with the first entity and a second entity, respectively, during the entity reset procedure; and applying a new ciphering configuration by the first entity and the second entity, upon completing the entity reset procedure, without updating the synchronized HFNs associated with the first entity and the second network, respectively.

In accordance with another aspect of the present invention, an apparatus is provided for applying a ciphering configuration in a wireless communication network. The apparatus includes a processor; and a memory that is coupled to the processor and stores instructions that when executed control the processor to initiate an entity reset procedure by a first entity in the wireless communication network, synchronize Hyper Frame Numbers (HFNs) associated with the first entity and a second entity, respectively, during the entity reset procedure, and apply a new ciphering configuration by the first entity and the second entity, upon completing the entity reset procedure, without updating the synchronized HFNs associated with the first entity and the second network, respectively.

In accordance with another aspect of the present invention, an apparatus is provided for applying a ciphering configuration in a wireless communication network. The apparatus includes a processor; and a memory that is coupled to the processor and stores instructions that when executed control the processor to receive a reset procedure request from another device, synchronize Hyper Frame Numbers (HFNs) associated with the device and the another device, respectively, while performing the reset procedure based on the received reset procedure request, and apply a new ciphering configuration upon completing the reset procedure without updating the synchronized HFNs.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
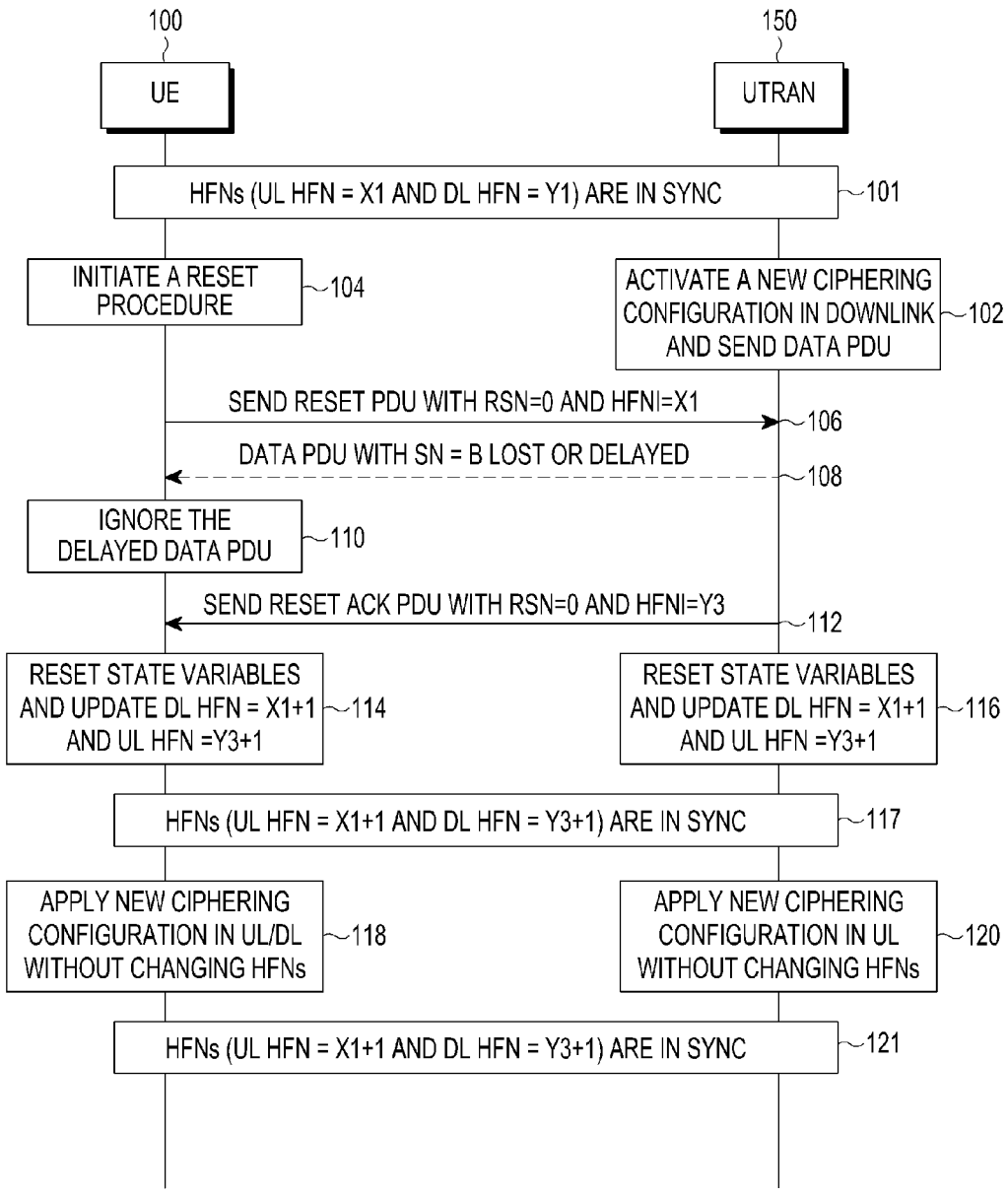
FIG. 1 is a signal flow diagram illustrating a method for applying a ciphering configuration by a UE and a UTRAN, upon performing a radio link control entity reset procedure, according to an embodiment of the present invention.

FIG. 1 is a signal flow diagram illustrating a method for applying a ciphering configuration by a UE and a UTRAN, upon performing a radio link control entity reset procedure, according to an embodiment of the present invention.

Referring to FIG. 1, in step 101, an UpLink HFN (UL HFN=X1) and a DownLink HFN (DL HFN=Y1) are synchronized for the UE 100 and the UTRAN 150.

In step 102, the UTRAN 150 applies new ciphering configuration at a specified activation time in a downlink, and sends a data PDU with a sequence number=B to the UE 100 indicating that the new ciphering configurations has been applied. After applying the ciphering configuration in the downlink, DL HFN=Y3. Although FIG. 1 illustrates the UTRAN 150 apply a new ciphering configuration, it is understood that the UE 100 may also apply a new ciphering configuration in an uplink in another scenario.

In step 104, the UE 100 initiates a reset procedure to reset state variables and other associated parameters at the UE 100 and the UTRAN 150. Alternatively, the UTRAN 150 can initiate a reset procedure.

After the reset procedure is initiated, the UE 100 sends a reset PDU (e.g., with RSN=0 and HFNI=X1), in step 106. However, because the reset procedure, the data PDU with the sequence number (SN=B) sent by the UTRAN 150 to the UE 100 in step 102, is delayed or lost, as illustrated in step 108.

When the data PDU is delayed due to interruption, the UE 100 discards the data PDU sent by the UTRAN 150, as the UE 100 is in a reset pending state, in step 110. Consequently, the UE 100 is not able to apply a new ciphering configuration in downlink.

In step 112, the UTRAN 150 acknowledges receipt of the reset PDU by sending a reset ACK PDU (e.g., with RSN=0 and HFNI=Y3) to the UE 100.

As the reset PDU is acknowledged by the UE 100, the UE 100 and the UTRAN 150 reset respective state variables at approximately the same time in steps 114 and 116, respectively.

In step 117, the UE 100 and the UTRAN 150 synchronize corresponding HFNs in the uplink and the downlink. For example, the HFNs in the uplink and the downlink at the UE 100 and UTRAN 150 after synchronization are X1+1 and Y3+1.

In step 118, the UE 100 applies a new ciphering configuration in the uplink and the downlink, and in step 120, the UTRAN 150 applies a new ciphering configuration in the uplink, subsequent to completion of the reset procedure, without updating the HFNs. More specifically, the UE 100 and the UTRAN 150 apply a ciphering mode and a ciphering key, and ignore an HFN value to activate the new ciphering configuration.

Consequently, in step 121, the HFNs in the uplink and the downlink at the UE 100 and the UTRAN 150 are synchronized, even after applying the ciphering configuration following the reset procedure.

Figure 2:
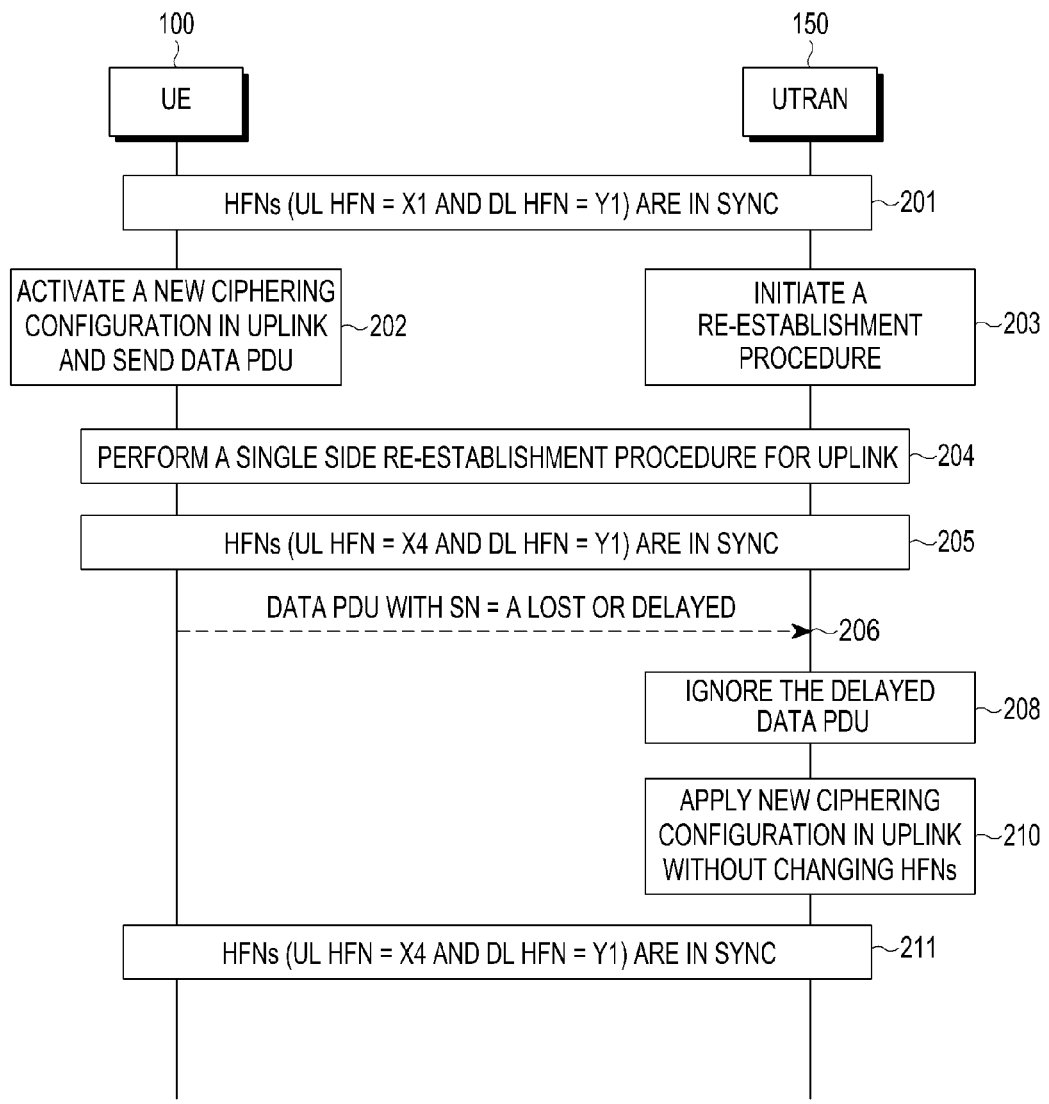
FIG. 2 is a signal flow diagram illustrating a method for applying a ciphering configuration by a UE and a UTRAN, upon performing a single sided radio link control entity re-establishment procedure, according to an embodiment of the present invention.

FIG. 2 is a signal flow diagram illustrating a method for applying a ciphering configuration by a UE and a UTRAN, upon performing a single sided radio link control entity re-establishment procedure, according to an embodiment of the present invention.

Referring to FIG. 2, in step 201, a UL HFN=X1 and a DL HFN=Y1 are synchronized for the UE 100 and the UTRAN 150.

In step 202, the UE 100 applies new ciphering configuration at a specified activation time in the uplink, and sends a data PDU with a sequence number=A to the UTRAN 150, indicating that the new ciphering configurations has been applied. After applying the ciphering configuration in the uplink, the UL HFN is changed to X3. Although FIG. 2 illustrates the UE 100 applying the new ciphering configuration, it is understood that the UTRAN 150 may also apply a new ciphering configuration in the downlink in another scenario.

In step 203, the UTRAN 150 initiates a single sided radio link control entity re-establishment procedure. In step 204, the single sided re-establishment procedure between the UTRAN 150 and the UE 100 is performed, and in step 205, the UE 100 and the UTRAN 150 synchronize corresponding HFNs in the uplink and the downlink. For example, after synchronization, the HFNs in the uplink and the downlink at the UE 100 and UTRAN 150 are X4 and Y1, respectively.

Due to the re-establishment procedure, the data PDU with the sequence number sent by the UE 100 to the UTRAN 150 is delayed or lost, as illustrated in step 206. When the data PDU is delayed due to an interruption, the UTRAN 150 discards the data PDU sent by the UE 100 due to the re-establishment procedure, in step 208. Consequently, the UTRAN 150 is not able to apply a new ciphering configuration in uplink.

In steps 210 and 211, the UTRAN 150 applies a new ciphering configuration in the uplink subsequent to completion of the re-establishment procedure without updating the HFN. More specifically, the UTRAN 150 applies a ciphering mode and a ciphering key to activate a new ciphering configuration and ignores an HFN value to avoid HFN desynchronization. Consequently, the HFNs in the uplink and the downlink at the UE 100 and the UTRAN 150 maintain synchronized, even after applying the ciphering configuration following the re-establishment procedure.

Although, the above described is described with reference to performing a single sided re-establishment procedure, the above-described method is also applicable to scenarios associated with a two-sided re-establishment procedure. For example, the UE 100 and the UTRAN 150 apply a new ciphering configuration in the uplink and the downlink subsequent to completion of the re-establishment procedure, without updating the HFN values to avoid HFN desynchronization.

Additionally, the above-described methods can be performed through a non-transitory computer-readable storage medium having instructions for applying a new ciphering configuration stored therein. Specifically, when executed by the UE 100 or the UTRAN 150, the non-transitory computer-readable storage medium having instructions for applying a new ciphering configuration cause the UE 100 or the UTRAN 150 to perform the methods illustrated in FIGS. 1 and 2.

Figure 3:
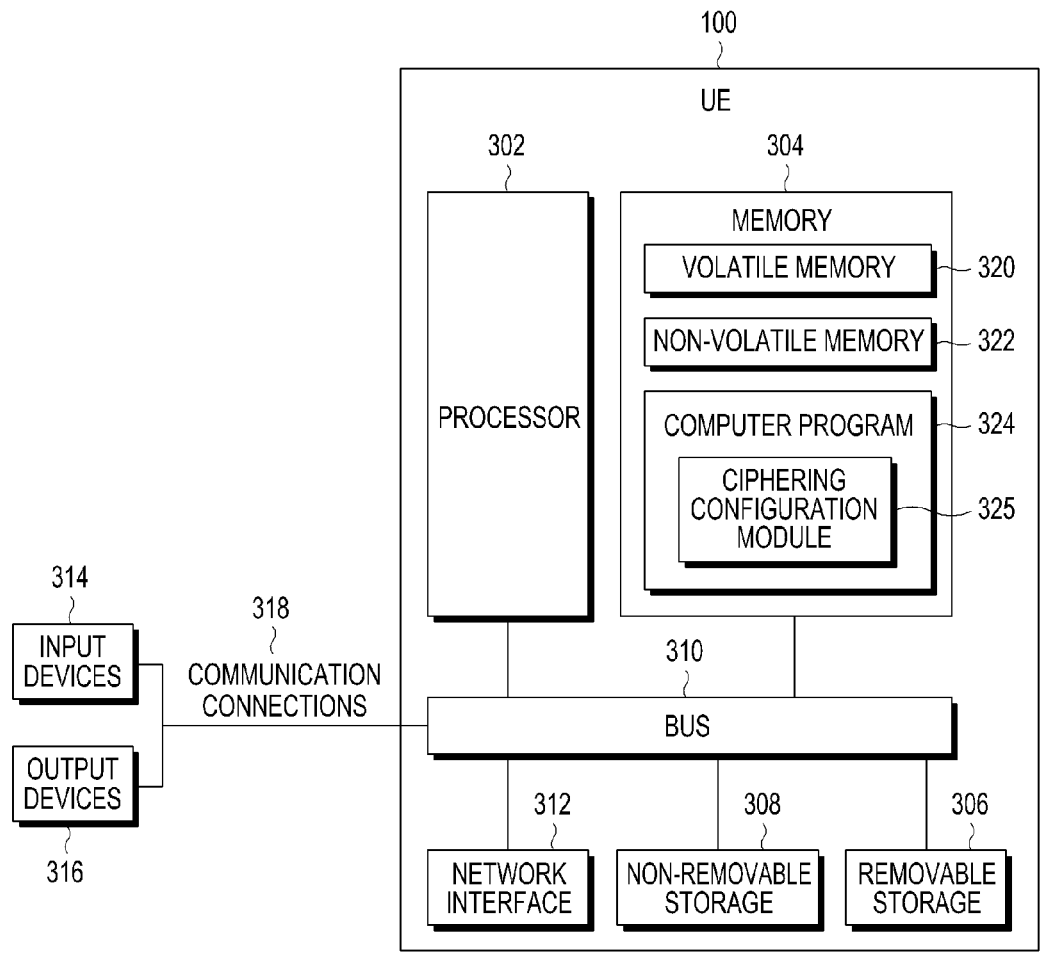
FIG. 3 is a block diagram illustrating a UE according to an embodiment of the present invention.

FIG. 3 is a block diagram illustrating a UE according to an embodiment of the present invention.

Referring to FIG. 3, the UE 100 includes a processor 302, a memory 304, a removable storage 306, and a non-removable storage 308. The UE 100 additionally includes a bus 310 and a network interface 312. The UE 100 may include or have access to one or more user input devices 314, one or more output devices 316, and one or more communication connections 318, such as a network interface card or a universal serial bus connection. For example, the one or more user input devices 314 may be keyboard, mouse, etc, and the one or more output devices 316 may be a display of the UE 100. The communication connections 318 may include a wireless communication network such as UTRAN.

The memory 304 includes volatile memory 320 and non-volatile memory 322. A variety of computer-readable storage media may be stored in and accessed from the memory elements of the UE 100, such as the volatile memory 320, the non-volatile memory 322, the removable storage 306, and the non-removable storage 308. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 302, as used herein, is a computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 302 may also include embedded controllers, such as generic or programmable logic devices or arrays, application specific integrated circuits, single-chip computers, smart cards, etc.

Various embodiments of the present invention may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 302 of the UE 100.

For example, a computer program 324 may include a ciphering configuration module 325 in the form of machine-readable instructions capable of applying a new ciphering configuration, according to the teachings and embodiments described above.

In accordance with an embodiment of the present invention, the computer program 324 is included on a compact disk-read only memory (CD-ROM) and loaded from the CD-ROM to a hard drive in the non-volatile memory 322. The machine-readable instructions cause the computing device 301 to encode according to the above-described embodiments of the present invention.

Figure 4:
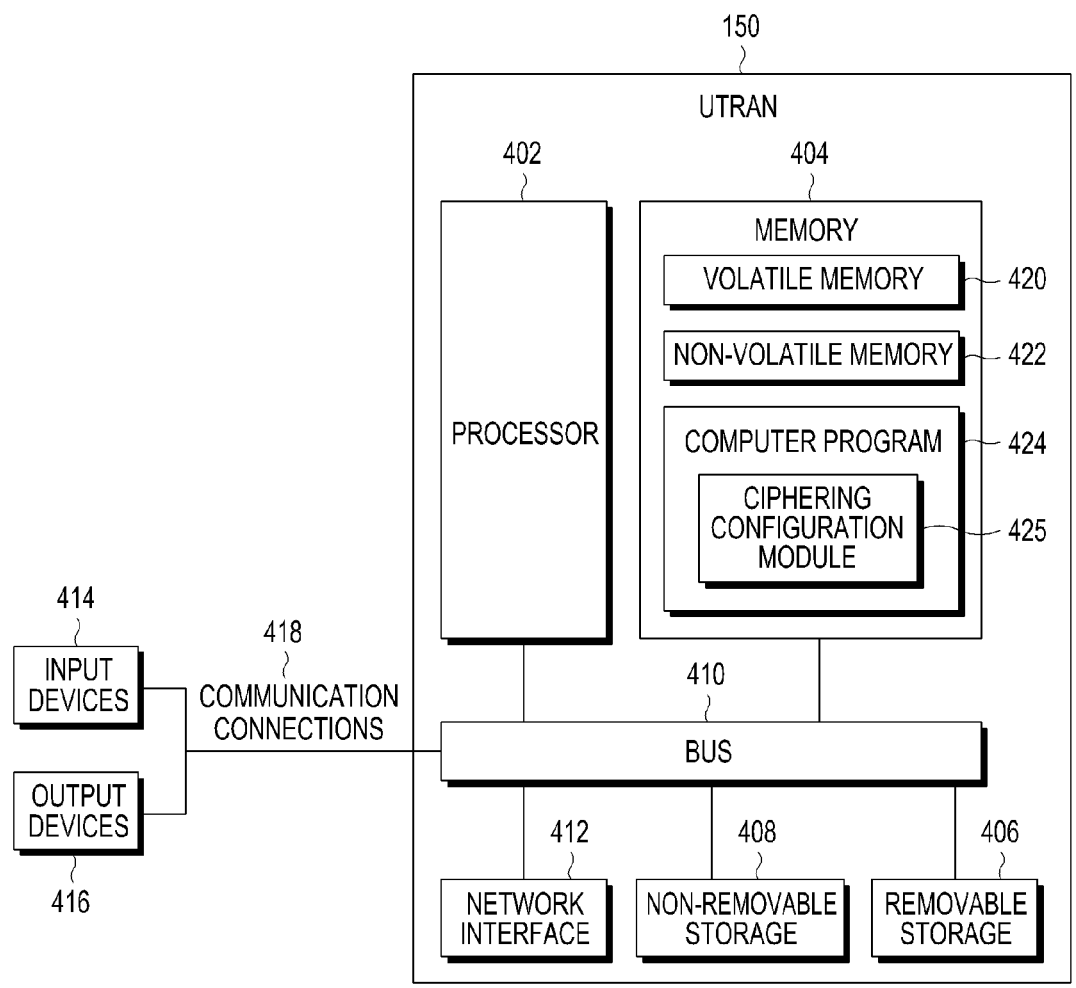
FIG. 4 is a block diagram illustrating a UTRAN according to an embodiment of the present invention.

FIG. 4 is a block diagram illustrating a UTRAN according to an embodiment of the present invention.

Referring to FIG. 4, the UTRAN 150 includes a processor 402, memory 404, a removable storage 406, and a non-removable storage 408. The UTRAN 150 additionally includes a bus 410 and a network interface 412. The UTRAN 150 may include or have access to one or more user input devices 414, one or more output devices 416, and one or more communication connections 418 such as a network interface card or a universal serial bus connection. For example, the one or more user input devices 414 may be keyboard, mouse, etc., and the one or more output devices 416 may be a display of the UTRAN 150. The communication connections 418 may include a wireless communication network such as a UTRAN.

The memory 404 includes volatile memory 420 and non-volatile memory 422. A variety of computer-readable storage media may be stored in and accessed from the memory elements of the UTRAN 150, such as the volatile memory 420, the non-volatile memory 422, the removable storage 406, and the non-removable storage 408. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 402, as used herein, is a type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 402 may also include embedded controllers, such as generic or programmable logic devices or arrays, application specific integrated circuits, single-chip computers, smart cards, etc.

Various embodiments of the present invention may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 402 of the UTRAN 150.

For example, a computer program 424 may include a ciphering configuration module 425 in the form of machine-readable instructions capable of applying a new ciphering configuration, according to the teachings and herein described embodiments of the present subject matter.

In accordance with an embodiment of the present invention, the computer program 424 may be included on a compact disk-read only memory (CD-ROM) and loaded from the CD-ROM to a hard drive in the non-volatile memory 422. The machine-readable instructions may cause the computing device 401 to encode according to the various embodiments of the present subject matter.

As evidenced by the above-described embodiments of the present invention, by providing a method and apparatus for applying a ciphering configuration in a wireless network, it is possible to prevent a loss of synchronization of the HFN when a new ciphering configuration is applied in the wireless network.

In addition, it will be appreciated that the various operations, processes, and methods disclosed herein may be embodied in a machine-readable medium and/or a machine accessible medium compatible with the UTRAN 150, and may be performed in any order.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of applying a ciphering configuration by entities in a wireless communication network, wherein the entities include a User Equipment (UE) and a Universal Mobile Telecommunications System (UMTS) Terrestrial Radio Access Network (UTRAN), the method comprising:
   initiating an entity reset procedure by a first entity in the wireless communication network;
   synchronizing Hyper Frame Numbers (HFNs) associated with the first entity and a second entity, respectively, during the entity reset procedure; and
   when a data Protocol Data Unit (PDU) with a sequence number indicating the second entity has activated a new ciphering configuration is either lost or discarded by the first entity because it was delayed, applying the new ciphering configuration by the first entity and the second entity, upon completing the entity reset procedure, without updating the synchronized HFNs associated with the first entity and the second entity, respectively.

2. The method of claim 1, wherein the entity reset procedure includes one of a radio link control entity reset procedure, a single sided radio link control entity re-establishment procedure, and a double sided radio link control entity re-establishment procedure.

3. The method of claim 2, wherein when the entity reset procedure includes the radio link control entity reset procedure, the first entity is the UE or the UTRAN.

4. The method of claim 2, wherein when the entity reset procedure includes the single sided radio link control entity re-establishment procedure or the double sided radio link control entity re-establishment procedure, the first entity is the UTRAN.

5. The method of claim 1, wherein the first entity and the second entity apply the new ciphering configuration by maintaining the synchronized HFNs in an uplink or a downlink without updating the synchronized HFNs.

6. The method of claim 1, wherein the new ciphering configuration is applied based on ciphering parameters selected from a ciphering mode and a ciphering key.

7. A non-transitory computer-readable storage medium having instructions stored therein for applying a ciphering configuration, that when executed by entities in a wireless communication network, cause the entities in the wireless communication network to perform a method comprising:
   initiating an entity reset procedure by a first entity in the wireless communication network;
   synchronizing Hyper Frame Numbers (HFNs) associated with the first entity and a second entity, respectively, during the entity reset procedure; and
   when a data Protocol Data Unit (PDU) with a sequence number indicating the second entity has activated a new ciphering configuration is either lost or discarded by the first entity because it was delayed, applying the new ciphering configuration by the first entity and the second entity, upon completing the entity reset procedure, without updating the synchronized HFNs associated with the first entity and the second entity, respectively.

8. The storage medium of claim 7, wherein the entity reset procedure includes one of a radio link control entity reset procedure, a single sided radio link control entity re-establishment procedure, and a double sided radio link control entity re-establishment procedure.

9. The storage medium of claim 8, wherein when the entity reset procedure includes the radio link control entity reset procedure, the first entity is a User Equipment (UE) or a Universal Mobile Telecommunications System (UMTS) Terrestrial Radio Access Network (UTRAN).

10. The storage medium of claim 8, wherein when the entity reset procedure includes the single sided radio link control entity re-establishment procedure or the double sided radio link control entity re-establishment procedure, the first entity is a UTRAN.

11. The storage medium of claim 7, wherein the first entity and the second entity apply the new ciphering configuration by maintaining the synchronized HFNs in an uplink or a downlink without updating the synchronized HFNs.

12. An apparatus for applying a ciphering configuration in a wireless communication network, the apparatus comprising:
   a processor; and
   a memory that is coupled to the processor and stores instructions that when executed control the processor to initiate an entity reset procedure by a first entity in the wireless communication network, to synchronize Hyper Frame Numbers (HFNs) associated with the first entity and a second entity, respectively, during the entity reset procedure, and, when a data Protocol Data Unit (PDU) with a sequence number indicating the second entity has activated a new ciphering configuration is either lost or discarded by the first entity because it was delayed, to apply the new ciphering configuration by the first entity and the second entity, upon completing the entity reset procedure, without updating the synchronized HFNs associated with the first entity and the second entity, respectively.

13. The apparatus of claim 12, wherein the entity reset procedure includes one of a radio link control entity reset procedure, a single sided radio link control entity re-establishment procedure, and a double sided radio link control entity re-establishment procedure.

14. The apparatus of claim 13, wherein when the entity reset procedure includes the radio link control entity reset procedure, the first entity is a User Equipment (UE) or a Universal Mobile Telecommunications System (UMTS) Terrestrial Radio Access Network (UTRAN).

15. The apparatus of claim 13, wherein when the entity reset procedure includes the single sided radio link control entity re-establishment procedure or the double sided radio link control entity re-establishment procedure, the first entity is a UTRAN.

16. The apparatus of claim 12, wherein the first entity and the second entity apply the new ciphering configuration by maintaining the synchronized HFNs in an uplink or a downlink without updating the synchronized HFNs.

17. An apparatus for applying a ciphering configuration in a device of a wireless communication network, the apparatus comprising:
   a processor; and
   a memory that is coupled to the processor and stores instructions that when executed control the processor to receive a reset procedure request from another device, synchronize Hyper Frame Numbers (HFNs) associated with the device and the another device, respectively, while performing the reset procedure based on the received reset procedure request, and, when a data Protocol Data Unit (PDU) with a sequence number indicating the second entity has activated a new ciphering configuration is either lost or discarded by the first entity because it was delayed, to apply the new ciphering configuration upon completing the reset procedure without updating the synchronized HFNs.

18. The apparatus of claim 17, wherein the reset procedure includes one of a radio link control entity reset procedure, a single sided radio link control entity re-establishment procedure, and a double sided radio link control entity re-establishment procedure.

19. The apparatus of claim 17, wherein the device is one of a User Equipment (UE) or a Universal Mobile Telecommunications System (UMTS) Terrestrial Radio Access Network (UTRAN).

20. The apparatus of claim 17, wherein the device and the other device apply the new ciphering configuration upon performing the reset procedure by maintaining the synchronized HFNs in an uplink or a downlink without updating the synchronized HFNs.

* * * * *